March 26, 1963  A. A. LEWIS  3,082,918
AUTOMATIC LIQUID FILLING DEVICE
Original Filed Jan. 4, 1955  6 Sheets-Sheet 1

Inventor
Albert A. Lewis, deceased
by Gertrude Lewis, Administratrix
By Louis Bernat
Attorney

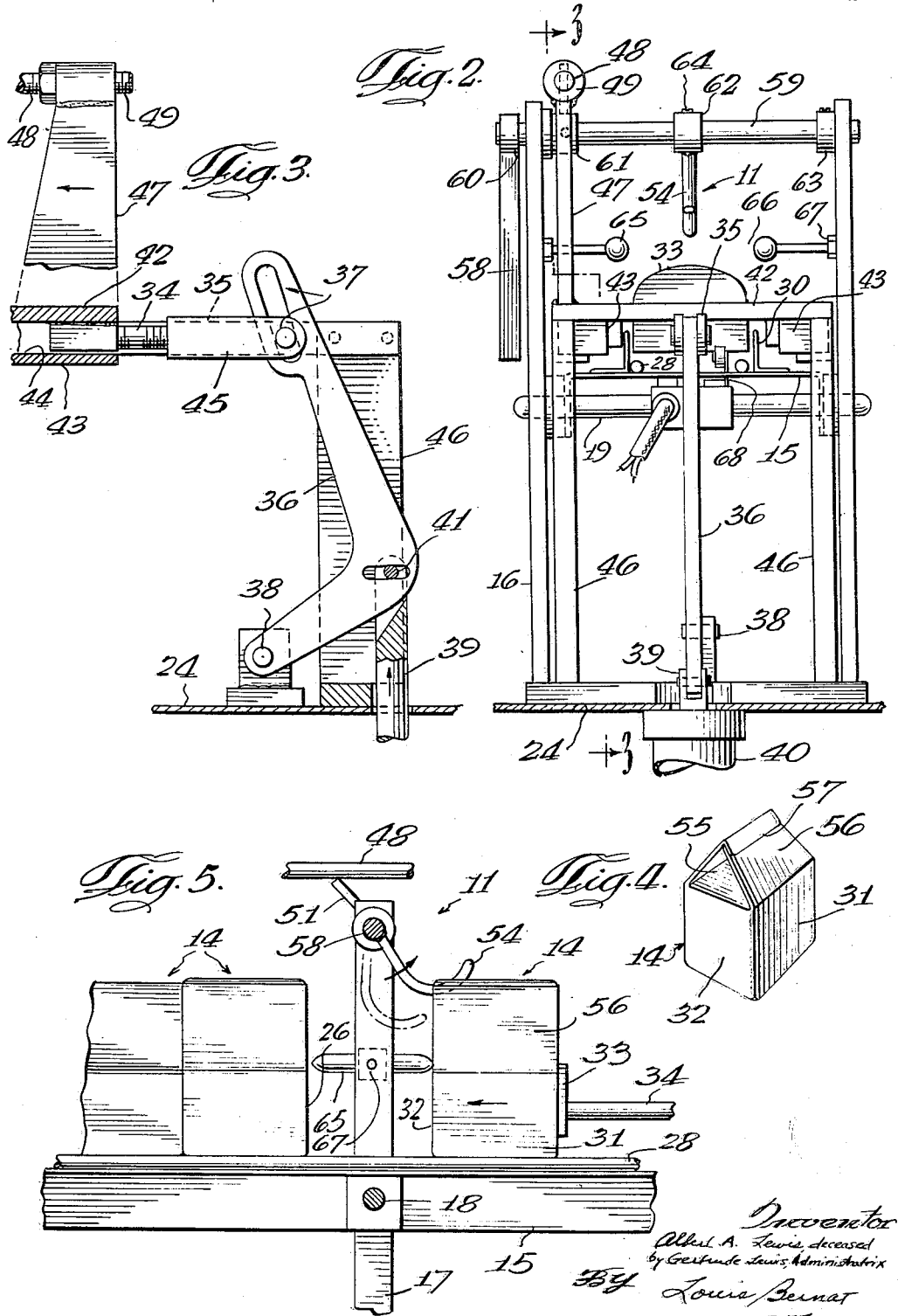

March 26, 1963 A. A. LEWIS 3,082,918
AUTOMATIC LIQUID FILLING DEVICE
Original Filed Jan. 4, 1955 6 Sheets-Sheet 4
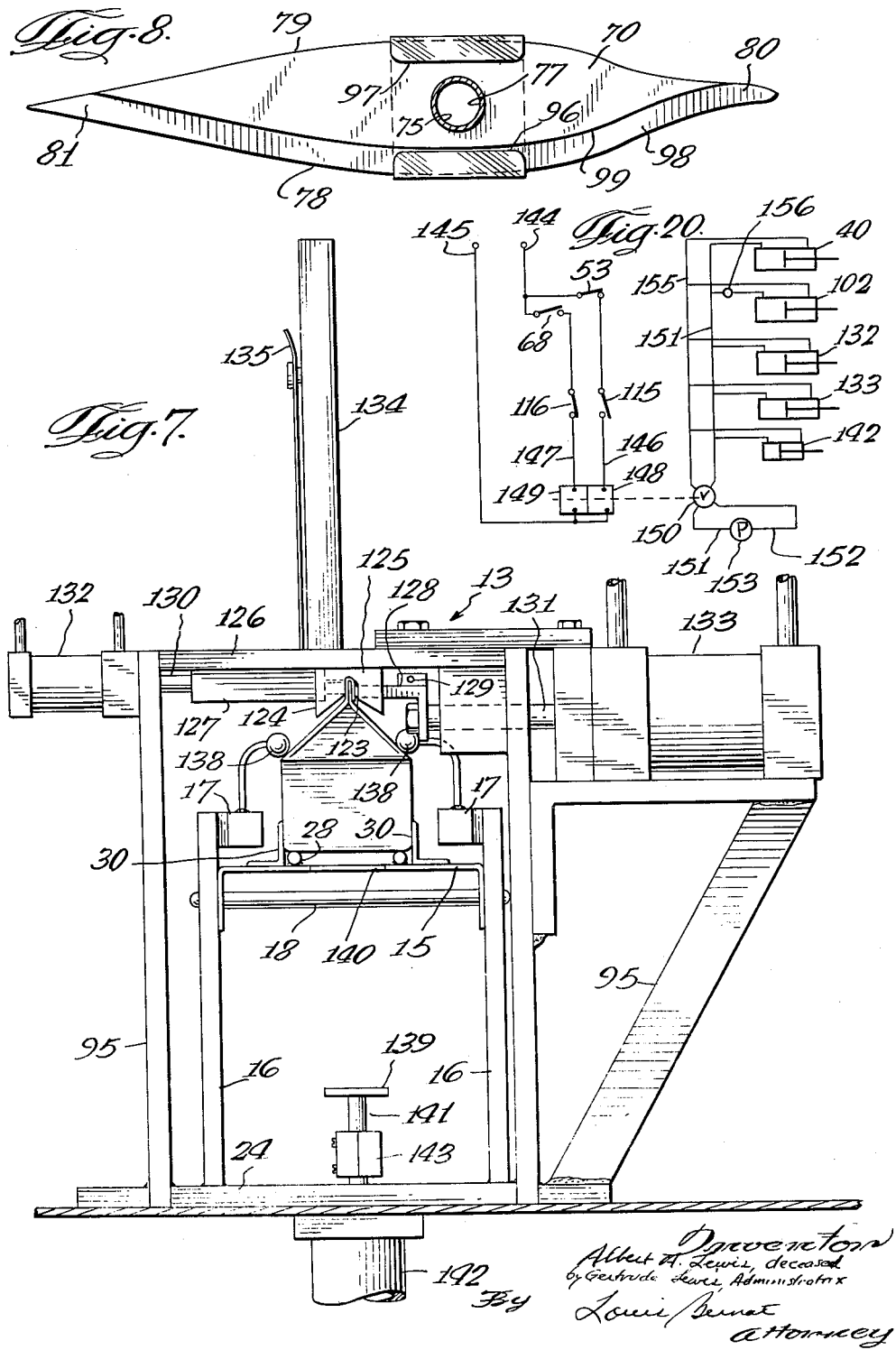

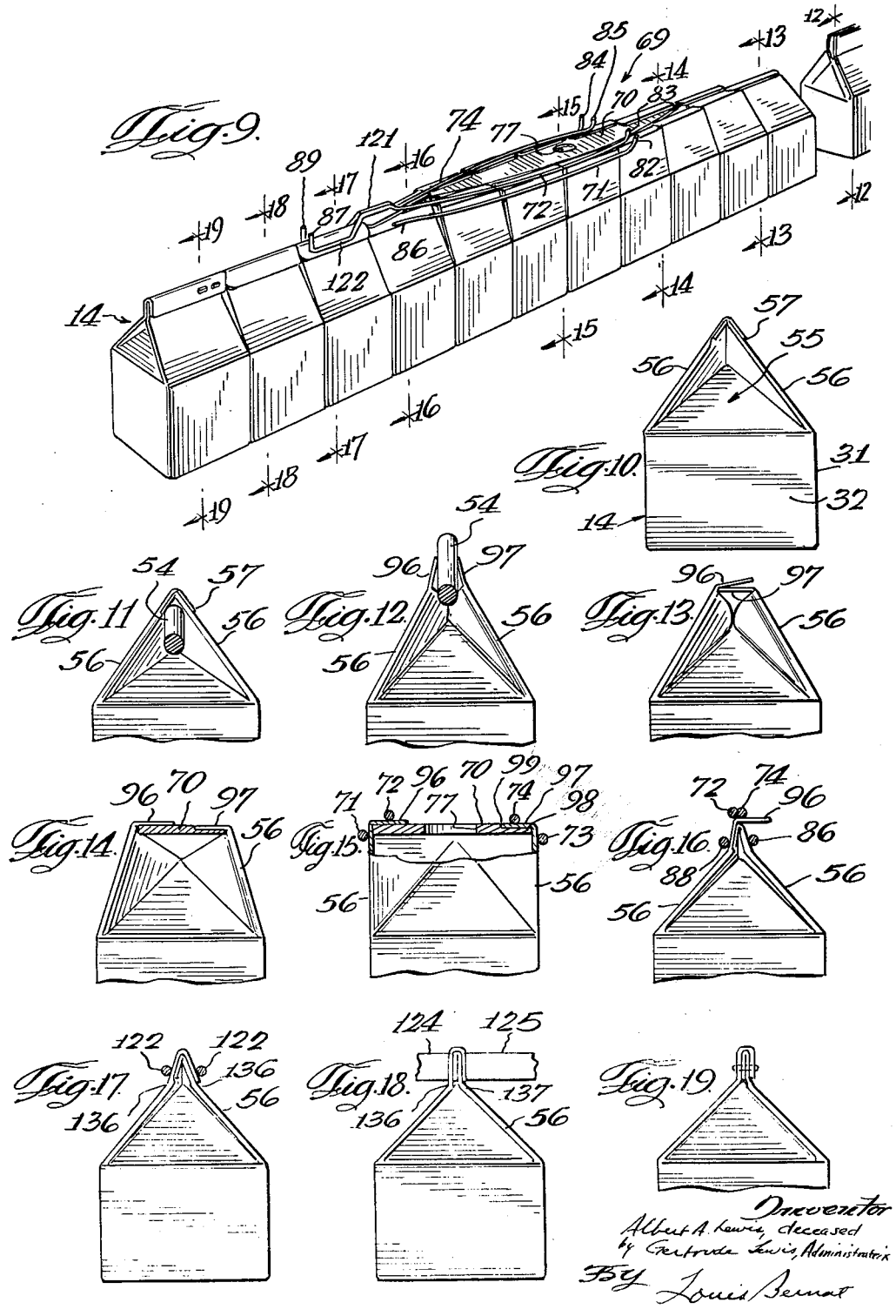

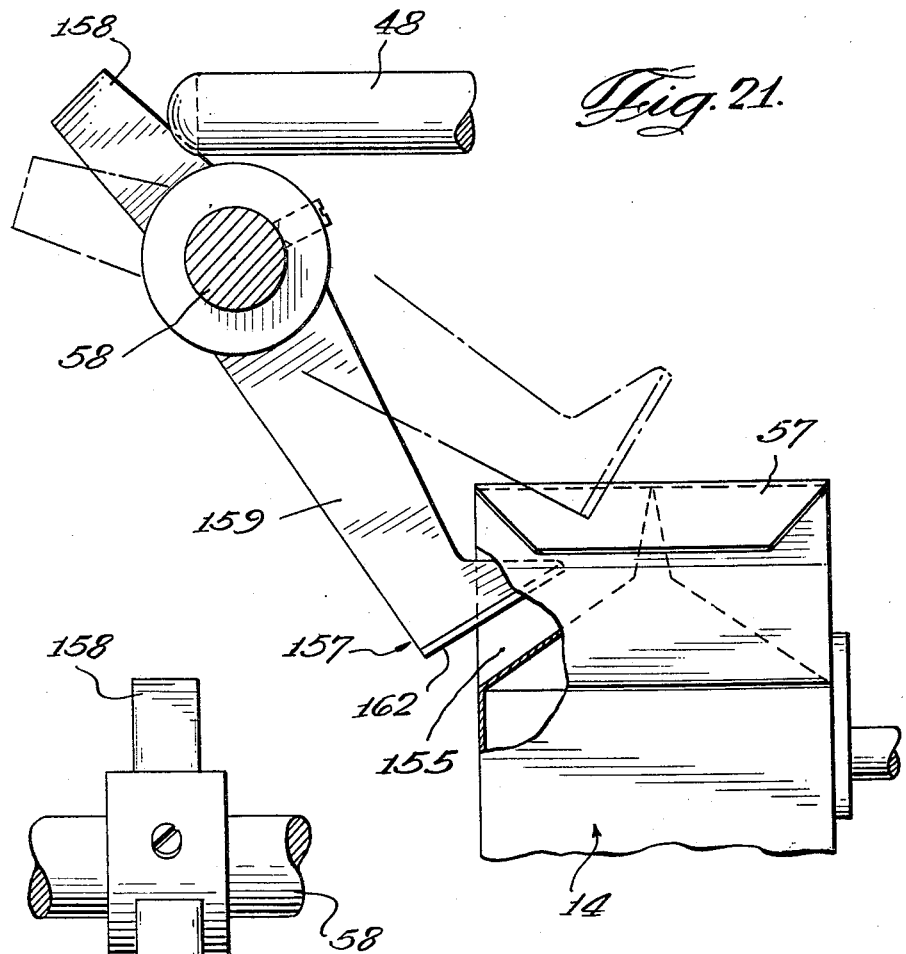
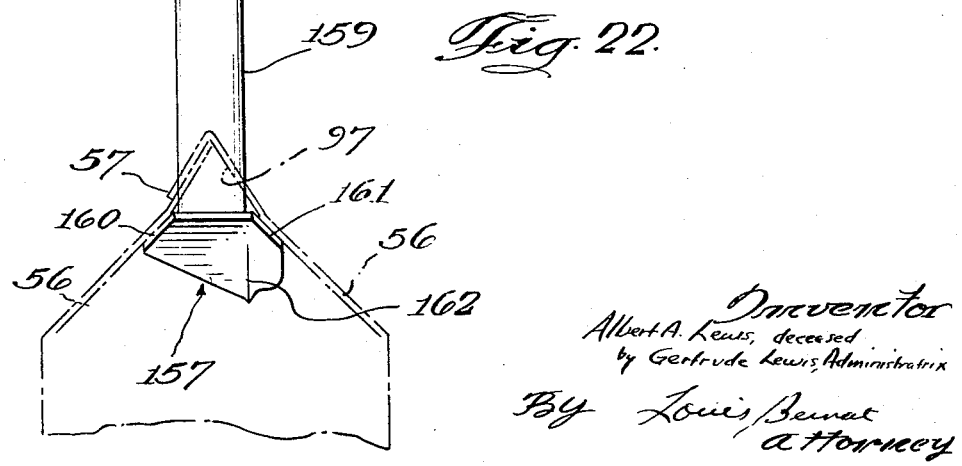

United States Patent Office 3,082,918
Patented Mar. 26, 1963

3,082,918
AUTOMATIC LIQUID FILLING DEVICE
Albert A. Lewis, deceased, late of 101 Ravinoak Lane, Highland Park, Ill., by Gertrude Lewis, administratrix, Highland Park, Ill.
Original application Jan. 4, 1955, Ser. No. 479,813, now Patent No. 2,962,845, dated Dec. 6, 1960. Divided and this application Oct. 31, 1960, Ser. No. 66,349
6 Claims. (Cl. 222—309)

This application is a division of Serial No. 479,813, filed January 4, 1955, now United States Patent No. 2,962,845, issued December 6, 1960.

This invention relates to the packaging of food, particularly liquid food such as milk, cream, etc. Germproof operation is a major objective in such packaging. The invention provides new apparatus and method, whereby this objective is achieved in improved manner.

A principal feature of the invention is that the number of parts requiring periodic cleaning is drastically reduced.

The improvement is particularly useful in connection with the filling of box-shaped cartons or fiber containers for milk and the like. Prior filling machines were primarily designed for glass bottles or metal cans. Vastly different principles govern the germproofing and filling of cartons; yet a number of design features of bottle and can machines have been used even in cardboard filling machines of the past. The new machine, by contrast, is thoroughly and basically redesigned for the germproof filling of box-shaped containers, made of fibrous materials such as cardboard and to be filled with milk, cream and the like. However, the new machine is also useful in different applications.

In the prior machines for germproof filling, each individual container was gripped by mechanical fingers or other holder means forming part of a special conveyor chain or the like, spacing the container from other containers and individually moving it through successive stations, usually along circular lines. The present machine uses no such fingers or retainers and no conveyor chain. Instead, it moves a row of the box-shaped fiber containers, in surface contact with one another, over an operating platform, desirably of straight design; the filling and other operative instrumentalities being disposed along said platform.

In this novel arrangement the successive containers themselves fulfill a function formerly performed by mechanical retainer and conveyor members. Formerly said mechanical members had to be dismantled and cleaned from time to time; desirably every day in a milk filling operation. The involved handling and reinstallation of numerous parts is eliminated by the new method and machine. A considerable saving is thus effected as to operating cost as well as first cost.

Of course it is well known to store and also to transport containers, both empty and filled, in direct contact with one another. The present machine is believed to be the first wherein containers intermittently move and stand as a contiguous row, in several of the preparator, loading and auxiliary positions for container filling.

Attention is drawn to the fact that according to this invention a contiguous row of containers moves and stands only on part of the operating platform. The row must be discontinuous at the entrance end, where the fiber containers are received in suitably tack-sealed, germproof condition and where they must be unsealed to allow filling. Here it is necessary to break an adhesive seal; and such breaking tends to cause distortion and/or vibration in the walls of the container operated upon. Such distortion and/or vibration must not be allowed to affect the row of containers wandering through or standing in the subsequent operative stations; otherwise, faulty positioning of containers might ensue. Such faults would even tend to cumulate throughout the row, in the rapid operation required of a filling machine. Therefore, it is a particular feature of this invention that an uninterrupted, contiguous row of containers is present on middle and end parts of the platform, for filling and resealing, but that individual containers wander over an entrance and unsealing part of the platform until they join this uninterrupted row.

Other objects are to provide effective and partly novel mechanism for the filling operation; for treating the top of each container preparatory to and subsequent to the filling operation; and particularly for the breaking of the original seal on the presealed container.

A further object relates to the automatic control over the various stages of operation. Such control is desirably effected by a system of limit switches and feeler switches, actuated by the filler mechanism and the moving cartons themselves, governing a system of hydraulic actuators and thereby actuating the cartons, the filler and other elements.

Desirably the movement of each carton over the platform—first individually and then as part of an uninterrupted row—and the resulting movement of some of the limit and feeler switches is effected by a single reciprocatory pusher member at the entrance end of the platform, suitably interlocked with piston and switch means of the filler mechanism. It is preferred that said pusher member also actuate the unsealing mechanism, in the interest of accurate mechanical coordination of the somewhat complex unsealing movements.

Other features of the invention may appear from the following description wherein a preferred embodiment of the new machine is disclosed.

In the drawing:

FIGURE 2 is an end view of the entrance end of the machine, the view being taken along lines 2—2 in FIGURE 1.

FIGURE 3 is a side elevation, partly in section, of the entrance end of the machine, certain parts being shown in positions different from those shown in FIGURE 1 and the section being taken along lines 3—3 in FIGURE 2.

FIGURE 4 is a perspective view of a typical milk carton which may be filled by the machine.

FIGURE 5 is a fragmentary side view of the unsealing station forming part of the machine.

FIGURE 7 is an end view of the end part of the machine, the view being taken along lines 7—7 in FIGURE 1.

FIGURE 8 is a plan view of a spreader element of the machine, used for shaping the container tops preparatory to, during and after the filling operation.

FIGURE 9 is a perspective diagram of the row of containers wandering through the machine.

FIGURE 10 is an end elevation of one of the containers in presealed condition as received on the entrance end of the machine.

FIGURE 11 and 12 are end views of the container tops in two consecutive stages of the unsealing operation, the respective views being taken in and adjacent the plane of lines 12—12 in FIGURE 9.

FIGURES 13 to 19 are end views of the container tops in various successive positions on the machine, the respective views being taken along the correspondingly numbered lines in FIGURE 9.

FIGURE 20 is an electric and hydraulic diagram of the control and operating system of the machine and FIGURES 21 and 22 are, respectively, side and front views of a modified detail forming part of the unsealing station in the machine.

Figure 1:
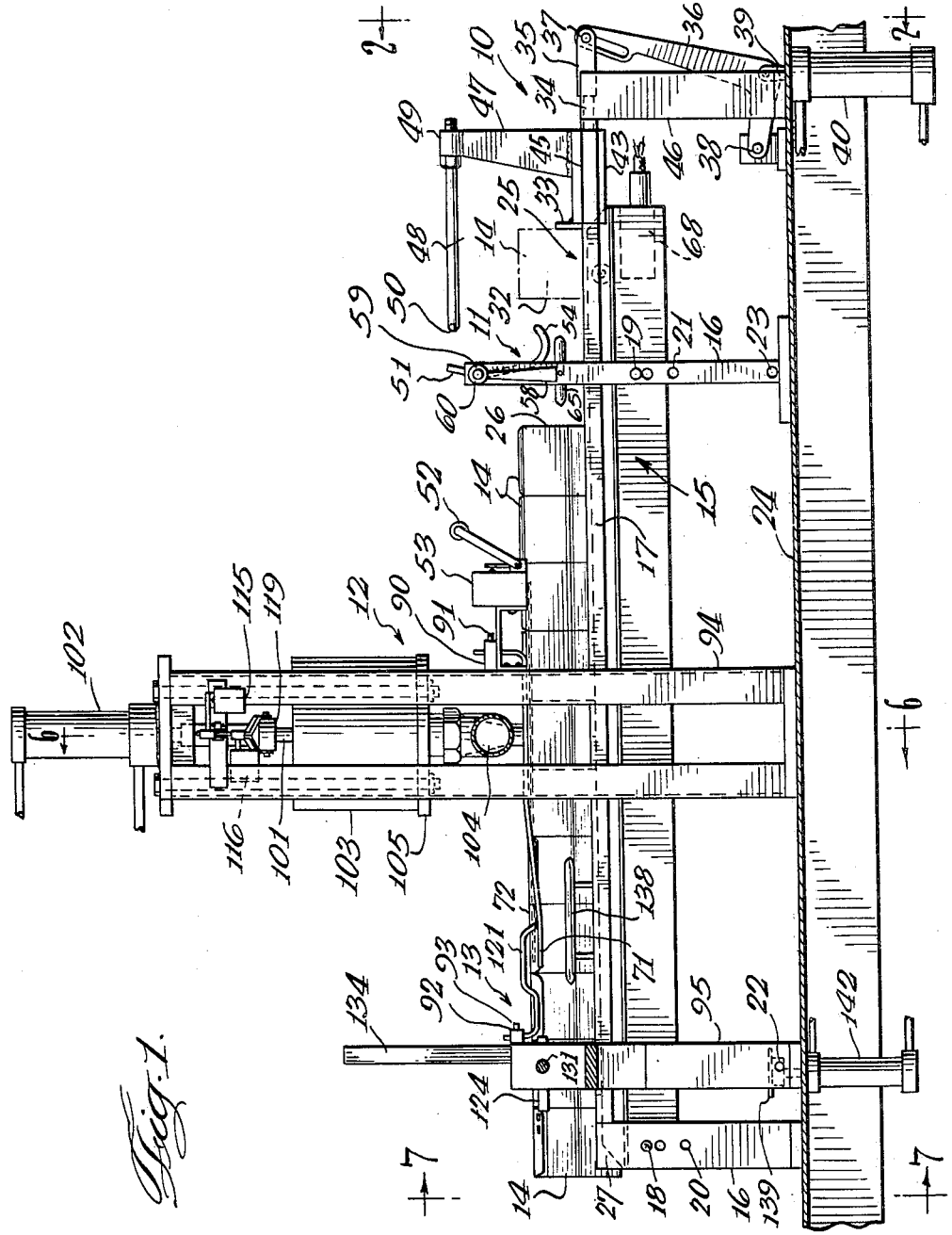
FIGURE 1 is a side elevation of the new machine.

Referring first to FIGURE 1 the machine comprises as major parts a pusher 10, an unsealer 11, a filler 12 and a resealer 13 for cartons 14 wandering over an elongated, straight, horizontal platform 15.

Figure 6:
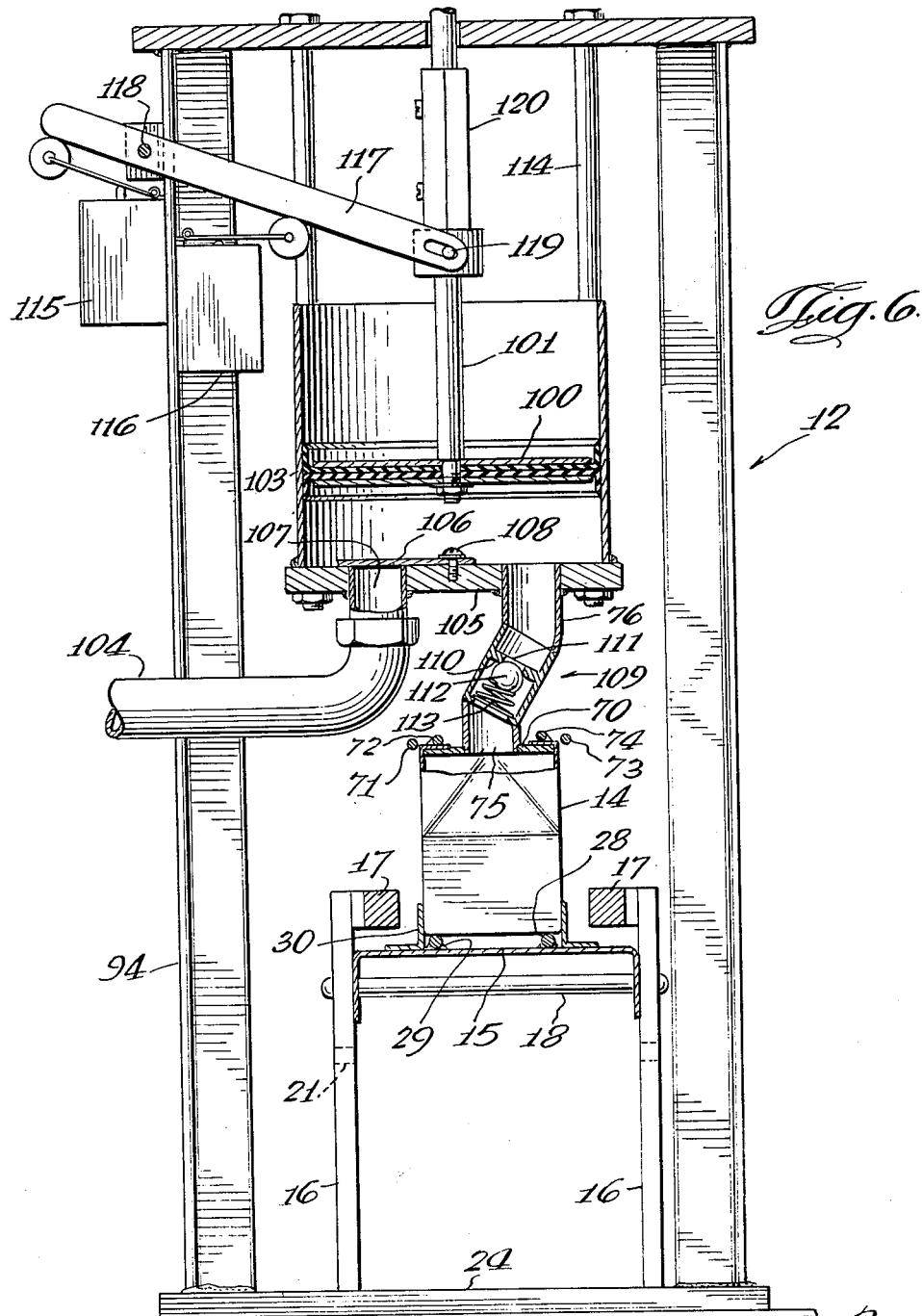
FIGURE 6 is a section through the filling station forming part of the machine, the section being taken along lines 6—6 in FIGURE 1.

This platform, as best shown in FIGURES 1 and 6, may have the form of an inverted channel supported by and vertically adjusted on a system of legs and rails 16, 17. For this purpose suitable bolts or pins 18, 19 may extend through the side flanges of the channel 15 and through selected holes 20, 21, etc. in the support legs. Depending upon the height of the containers 14 to be filled, either upper or lower holes 20, 21, etc., may be used for the support of the platform. Also, when different containers are to be filled their horizontal dimensions may vary. Correspondingly, the unsealer 11 and resealer 13 may be readjusted horizontally, relative to the filler 12, as by suitable bolt means 22, 23 engaging suitable rigid parts (not shown) of the bottom frame 24 of the machine. This frame may be supported in various obvious manners (not shown).

Referring to FIGURES 1 to 3, the pusher 10 is adapted to move individual containers 14 from the entrance end 25 of the platform through the unsealer station 11 and past said station into contact with a previously formed, uninterrupted row of manually contacting containers 14 on the platform. The position 26 where the newly added container first makes contact with this row is accurately determined by the pusher itself, as will now be described.

In this connection it may first be noted that, when the newly added container has been contacted with the previously formed row at 26 the pusher 10 continues to push this container along the platform 15 whereby it now pushes the entire previously formed row of containers along this platform and pushes the last completed container off from the outlet end 27 of the platform. Generally, both the adding of new containers at 25 and the disposal of containers discharged at 27 are achieved by conveyor mechanism or the like (not shown). For present purposes it may be considered that such auxiliary functions can sometimes be performed by hand, although the machine is also capable of operation at a speed where manual loading and unloading is impossible.

In order to move rapidly but smoothly and orderly over the platform 15, under the pushing action mentioned, the containers are shown as having their square, flat, wax-covered bottoms resting directly on smooth, round rods or track members 28, suitably secured to the platform 15 as by weld seams 29. The containers are guided longitudinally of the platform 15 by angle members 30 acting as side rails. These members 28 and 30 may extend along the entire platform 15 in straight parallel lines. They keep the rectangular, vertical waxed side walls 31 of the box-shaped containers 14 accurately parallel with the line of travel. Thus the end walls 32 of the containers are accurately normal to such line of travel, thereby preventing undue friction between mutually contacting containers and faulty positioning thereof.

A vertical pusher plate 33 is held above the platform and track structure 15, 18 by a horizontal pusher bar 34 which by means of a clevis 35 can be reciprocated by an L-shaped lever 36; a suitable slot and pin connection 37 being provided for this purpose at the upper end of the lever. The lever is fulcrumed to the bottom frame 24 at 38. It is actuated by a piston rod 39 upwardly extending from a vertical hydraulic cylinder 40 which may be secured to the underside of the bottom frame 24. An additional slot and pin construction 41 may be provided between the piston rod 39 and lever 36. Cyclic rising and falling of the piston rod 39 causes the pusher plate 33, through the intermediary mechanism 36, 34, to perform cyclic strokes from the entrance end 25 toward the unsealer, filler, and resealer mechanism 11, 12, 13 and back to the entrance position 25.

Rigidly connected with the pusher plate 33 by a bar 42 is a pair of slide blocks 43, one on each side of the platform 15. Each block 43 has a horizontal groove 44 formed therein and slidable along a suitable horizontal guide track 45 rigidly mounted on a system of support legs 46 installed on the bottom frame 24 adjacent the lever 36.

One of the blocks 43 carries an upstanding post 47, which in turn has a horizontal rod 48 rigidly but longitudinally-adjustably secured thereto at 49; this rod being used as a combined unsealer-actuator and pusher limit control, as will now be explained.

Inspection of FIGURE 1 shows that the front end or tip 50 of the rod 48 is positioned slightly ahead of the front wall 32 of any container 14 the opposite wall of which contacts the pusher plate 33. It will further be seen from FIGURES 1, 2 and 5 that forward travel of the tip 50 first actuates an operating dog 51 of the unsealer mechanism 11 and later actuates the feeler 52 of a limit switch 53. As the point 50 reaches, moves and depresses the dog 51 it causes a breaker member 54 of the unsealer to rise and remain in raised position. This breaker member is here shown as a hook formed of round bar stock. The arrangement is such that the rising of the hook 54 coincides with the arrival of the newly added container 14 at the unsealer station. The rising hook enters into a front recess 55 formed between upwardly-inwardly sloping lateral top walls 56 of the container. The hook rises further, resulting in the required breaking of the preliminary seal 57 at the top of the container, adjacent the front wall 32. As the hook 54 is kept in raised condition while the container 14 moves forward under the urge of the pusher plate 33, the breaking of the seal 57 is completed as the forward stroke continues.

Immediately thereafter the front wall 32 reaches the position 26 occupied by the rear wall of the last previously added container 14. All containers are now parts of an uninterrupted, contiguous row.

The forward movement of the pusher plate continues further, so that from now on the entire row of containers moves along the platform 15. This operation continues until the tip 50 reaches the feeler 52 and operates the limit switch 53. Thereupon the forward stroke is terminated, in manner to be described hereinafter, and the return stroke of the pusher begins.

As the return stroke continues the actuating dog 51 of the unsealer hook 54 is released by the rod 48 and the hook returns to its original position. As to this position it may be noted that, in order to perform the successive unsealing strokes as rapidly as possible, the hook 54 is not allowed to swing to the lowest point of its own center of gravity but is held slightly raised by a counter weight 58. This counterweight is shown as being fast on the same shaft 59 to which the actuating dog 51 and hook 54 are secured by their respective collars 60, 61 and 62. An additional collar 63 may serve to hold the shaft 59 against lateral displacement. The various collars are secured to the shaft by set screws 64 or the like. It may also be noted that, in order to prevent the container 14 from rising up from the platform and track structure 15, 28 under the lifting action of the unsealer hook 54, a pair of retainer members 65, 66 may be secured to the platform structure at the unsealer station on both sides of the path for the containers; each retainer member being simply an elongated bar of circular cross section horizontally installed by means of a holder and attachment member 67 and positioned so as to contact the inwardly-upwardly sloping walls 56.

The return stroke continues until the piston rod 39 and pusher plate 33 reach their fixed terminal positions. A new forward stroke ensues when a new container 14 is added in front of the pusher plate 33, operating a starting switch 68 as will be described hereinafter.

Referring now to FIGURES 9 to 19: A row of about ten containers 14 is present in the machine at all times of normal operation, new containers being added cyclically at the entrance end and filled and resealed containers being cyclically removed from the exit end. Between these ends and more specifically between the unsealing and resealing stations the container top portions are engaged, held and formed by a forming mechanism generally shown at 69, in order to effect a smooth and proper transition from the unsealing to the filling stage, through the latter stage and from there to the resealing stage. In substance the mechanism 69 consists mainly of a horizontal spreader plate 70, separately shown in FIGURE 8, one system of clamp members or wires 71, 72 extending along one edge of the spreader plate and a similar system 73, 74 extending along the other edge. All these members 70 and 74 extend in general directions longitudinally of the platform 15 and above the same at the approximate level of the container tops; it being understood that this level is maintained whereas the platform 15 can be raised or lowered to different extents below said level to accommodate containers of different height. It will also be understood that in the case of containers of different length, wall thickness, etc. different shaping members 70 to 74 can be installed in the machine. Also, some of the shaping members 70 to 74 can be exchanged while others are kept in place; for instance a new spreader plate can be installed while the wires remain in position or a new set of wires or bars can be installed while the spreader plate remains, in order to facilitate interchange as to filler openings, container materials, etc.

For these purposes the spreader plate 70 is securely but removably press-fitted on the shoulderd discharge end 75 of a filler duct 76 (see FIGURE 6) and it engages this discharge end by a filling and mounting opening 77, located symmetrically between the side edges 78, 79 of the plate and between its front and rear ends 80, 81. Thus the plate is suspended from a central portion thereof. The wires 71 to 74 on the other hand are suspended by upturned end portions 82 to 85 thereof at their front end—related respectively to the wires 71 to 74. Said wires have, respectively, ends 86 to 89 at the back end of the machine, it being possible however to terminate the outer wires 71, 73 in freely cantilevering position as shown. The four front ends of the wires extend through suitable holes in a rigidly mounted horizontal bar 90 (see FIGURE 1) wherein the wires are held by set screws 91. The rear ends of the wires 72 and 74 are similarly supported in a bar 92 by set screws 93. The bars 90 and 92 are suitably fastened to support members 94, 95 of the filler and resealer mechanisms 12, 13 respectively.

The exact configuration of the forming members 71 to 74 is illustrated in a manner adapted for work on pint-size containers 14 for cream and the like. As shown in FIGURE 10 such containers are delivered to the machine with top walls 56 forming an equilateral prism oriented longitudinally of the machine and with upper parts of their end walls 32 having sufficient fullness to allow hinging of the sloping walls 56 and forming recesses 55 of the approximate shape of a triangular pyramid at each end. The manner in which the unsealer 11 breaks the seal 57 at the top edge of the container is shown in FIGURES 11 and 12, where it will also be noted that the seal 57 in effect consists of two tabs 96, 97 hinged to the left and right sloping walls 56 respectively. These tabs will also be noted in FIGURE 8 where they are shown as positioned adjacent the filler opening 77 and folded over the left and right edge portions 78, 79 of the spreader plate 70 respectively. This latter position is also shown in FIGURE 15. Before it is reached the container top is released by the unsealer as shown in FIGURE 13 and the front end of the spreader plate 70 is inserted therein as most clearly shown in FIGURE 14. It may also be noted in FIGURES 8, 14 and 15 that the spreader plate 70 has a step and shoulder 98, 99 extending along one of its edges 78, 79 and machined into the corresponding edge portion in order to accommodate the slightly different container wall configurations along the left and right hand tabs 96, 97; one of these tabs 97 being disposed inside and the other 96 outside and the respective sloping walls 56 being correspondingly shorter and longer by a small differential amount. This slight difference may appear to be one of the mere minutiae of the carton 14; however the stepping 98, 99 of the spreader plate 70 has been found to be important if and as the cartons are to be pushed forwardly without undue friction, as a continuous and contiguous row sliding along the spreader plate.

Short distances backwardly of the front end 80 of the spreader plate the front ends of the shaping wires 71 to 74 engage the tab and wall structure 56, 96, 97 as best shown in FIGURES 9 and 15, holding the side walls 56 securely in contact with the side edges of the spreader plate and the tabs 96, 97 closely but slidably down on the top surface of this plate.

As a new container 14 is pushed into and beyond contact with the surface 26 by the pusher plate 33 the next container is pushed into the position of FIGURE 14. The then following container in the row is pushed into a position intermediate FIGURES 14 and 15 and the next one is pushed into the filling position of FIGURE 15. Previously filled containers are also pushed on as will be described hereinafter. For the moment it must be recalled that the pushing action is reciprocatory and that accordingly the travel of the row of containers described is intermittent. The last added container as mentioned is left in a predetermined position upon the operation of the limit switch 53. This position is so selected with respect to the length of the containers that at this time the container in filling position of FIGURE 15 is substantially centered with regard to the filling opening 77. Minor deviation from such centering, caused by the flexibility of the cardboard containers contacting each other and travelling subject to unavoidable variations of friction along the spreader plate, will not interfere with the proper operation of the filler 12 or of the subsequent mechanisms.

During the forward travel of the row of cartons, a piston 100 forming part of the filler 12 has been raised by a piston rod 101 actuated by hydraulic pressure in a vertical cylinder 102 as will be clear from FIGURES 1 and 6. The filler cylinder 103 wherein the piston 100 operates has an inlet duct 104 connected to a supply of milk or the like and leading to the cylinder bottom 105. The previously mentioned discharge duct 76 is connected to the same cylinder bottom. An inlet check valve may be provided very simply by installing a flexible plate 106 upon and in contact with the inner or top surface of the bottom 105, across the opening 107 through which the cylinder communicates with the inlet duct 104; this plate or check valve flap being secured to the bottom 105 by a screw 108. An outlet check valve 109 can be incorporated in the duct 76 by providing a restriction 110 therein with a central orifice 111, the underside of which engages a ball 112 loaded upwardly by a spring 113. When the piston 100 rises the inlet check valve 106 opens and the outlet check valve 109 closes, whereas these actions are reversed when the piston 100 descends.

The cylinder 103 is suitably supported from the framework 94 by bolts 114 whereas the spreader plate 70 as mentioned before is supported from the bottom of the cylinder 103 and duct 76.

Upper and lower limits for the stroke of the piston 100 are established by electric controls, to be functionally explained hereinafter and which comprise an upper limit switch 115 and a lower limit switch 116, both secured to and vertically adjustable along the support 94 and engaging an actuator lever 117, fulcrumed at 118 and operated by a pin and slot mechanism 119 forming part of a removable split collar 120 on the piston rod 101. The filling of containers of different size can be achieved by suitable vertical adjustment of the collar 120 and/or one or both of the switches 115, 116.

When a container has been filled and when the next forward stroke of the pusher plate 33 and of the row of containers occurs the filled container is shifted along the platform, below the spreader plate, and said spreader plate with its co-acting top forming wires begins to prepare the container for the resealing operation. The back part of the plate 70 accordingly tapers toward the discharge end 27. Desirably several containers are interposed between the filling station 12 and the resealing station 13 in order to allow gradual tapering of the spreader plate and also to allow gradual venting of air from foam which may be formed incident to the filling operation under certain conditions. As a container intermittently slides along this tapering end the wires 71 to 74 continue to press the walls 56 and flaps 96, inwardly and downwardly respectively thereby gradually establishing the position of FIGURE 16. Here the sloping walls 56 are caused by the lower and outer wires 71, 73 to converge and to be pressed down substantially as far as the fullness of the wall material in the former recess 55 allows, that is, to a greater extent than in the original presealed condition of FIGURE 10; the inner flap 97 being reinserted in the container by the pressure of the wire 74, the outer flap 96 being folded around the top of the container by the cooperation of the latter wire with the wire 72 and the subjacent portions of the walls 56 being bent so that their upper ends approach vertical position. The folding over of the upper and outer flap 96 is facilitated by the feature that the upper and inner forming wires 72, 74 are bent upwards from their normal position, adjacent the plane of the spreader plate 70, as clearly shown in FIGURE 9 adjacent the section line 16—16. The offset portions 121 so formed in these wires facilitate the closing and subsequent resealing measurably. However, it is usually desirable to provide final portions 122 of said wires, lying in the original plane adjacent that of the spreader plate, as clearly shown in FIGURE 17.

A substantial clamping effort is required to form the container top from the various positions of FIGURES 10 to 15 into those of FIGURES 16 and 17. This operation is facilitated by the provision of the wire portions 122 which in view of the arrangement described are close to the holder portions 87, 89 of these wires so that they can apply a substantial clamping force to the container walls. The work of the resealing station 13 is greatly simplified in this manner.

Referring now to FIGURES 7, 18 and 19 a container enters the resealing station 13 with its top formed in the manner as just described, whereby the container top fits fairly closely into a narrow downwardly open slot 123, formed between a pair of heating and pressure-applying members 124, 125 forming part of the resealing station. Electric heating coils (not shown) are provided in these heating members in order to melt portions of the wax on the container wall surfaces and thereby to insure hermetic closure.

Such closure requires also that the container top be squeezed tightly to form substantially vertical, laminated layers at the point where the ultimate stapling together is to be done in order to hold the container hermetically sealed in storage and transit. For this purpose the slotted guide and heating elements 124, 125 are rigidly secured to a normally stationary bar 126 installed on the resealer support legs 95. Slidable in one of these elements 124 is a secondary heating and stapler die element 127 whereas the other guide and heater portion 125 has slidable therein a secondary heater and stapler platen element 128. Suitable electric heater connections are provided on said secondary elements as illustrated at 129. The elements 127, 128 are horizontally slidable opposite one another and transversely of the line of travel of the cartons by means of piston rods 130, 131, hydraulically actuated respectively by cylinders 132, 133. It may be noted that the latter cylinder is substantially larger than the former; by means of this expedient the stapler platen is substantially held in place while the stapler die drives a staple home through the several folds of the carton top, and hydraulic pressure can still be supplied to both cylinders from the same source and at the same magnitude. Staples for the driving operation are stored in a chute 134 upstanding from and rigid with the guide and heater element 124, with a conventional staple-loading and resupply mechanism 135.

The mechanical details of the stapler die and platen need not be described in general since well-known mechanism can be used for this purpose. It may be noted however that, as the stapler die and platen members 127, 128 close in against the sloping side walls 56 of a carton they apply an uplifting force to the carton as they bring the preformed carton portions 136, 137 horizontally together; FIGURES 17 and 18. The carton may thereby be lifted slightly from the platform 15 as it is being sealed.

Such slight lifting of the carton has been found unobjectionable so long as it is not allowed to affect the position of cartons in preceding stages of the machine; and this can be achieved very simply by hold-down rails or guide members 138 extending along the row of cartons between the filler 12 and resealer 13 in the same manner as has been described for the similar members 65 in the unsealer station 11. When such protection is applied it may even be desirable to supplement the uplift mentioned by means of a vertically operable pusher 139 disposed exactly below the resealer station, adapted by an opening 140 to reach a container bottom from below through the platform 15 and operable by a vertical piston rod 141 hydraulically powered by a cylinder 142. A split collar 143, interconnecting separate parts of the rod 141, may adapt the pusher 139 to operate on containers of different height which as mentioned have their bottoms disposed at different elevations in the machine. The supplementary pushing action described is particularly important for the sealing of relatively large containers since the weight of milk or other material in such containers would otherwise tend to counteract the lifting tendency mentioned and thereby to produce inadequate sealing. By means of the auxiliary lift such danger is safely avoided. In the case of the largest and heaviest containers filled by the machine it may even be desirable that the lifting stroke of the pusher 139 be sufficient in length to apply a slight crushing action to the container top incident to the sealing operation. When this operation is performed the row of containers is at rest in its horizontal travel through the machine; immediately thereafter, by means of electrohydraulic interlocks to be described presently, the entire row is promoted by one step while the sealer die and platen are retracted. Thereupon the container is free to rest upon the operating platform again so that it arrives at the discharge station 27 in properly predetermined position for transfer to the exit conveyor (not shown).

Referring now to FIGURE 20 the control system for the machine will be found very simple; more simple indeed than the control systems for the earlier types of bottle or carton-filling machines wherein intricate controls were required for actuating the retainer fingers spacing and holding the individual cartons. Electric current is supplied from a source (not shown) through a pair of line conductors 144, 145 the first of which has a pair of branches 146, 147, having respectively, solenoids 148, 149 of a push-pull solenoid valve 150 interposed thereon. Also one branch 146 has the aforementioned limit and feeler switches 53, 115 interposed thereon in series while the other branch 147 has the aforementioned limit and feeler switches 68, 116 interposed thereon in series.

The solenoid valve 150 provides a hydraulic four-way control so that it can connect either the pressure side 151 or the suction side 152 of an oil pump 153 to the hydraulic system of the operating cylinders and particularly either to a forward stroke duct 154 or to a return stroke duct 155. These ducts 154, 155 communicate with the hydraulic cylinders through suitable branches. It may be desirable to interpose a hydraulic speed control orifice 156 upon some of these branch connections and particularly upon the connection from the forward stroke duct 154 to the filler actuator cylinder 102; a speed control being desirable at this point because of the different flowing and foaming characteristics of different fluids to be packed. It will be noted from the description of the operating cycle which follows immediately that the speed control applied at this one point automatically causes proper adjustments in the other interlocked hydraulic and electric operations.

Before the start of operation the switches 53 and 68 are open. The switches 115, 116 are so arranged that 115 is closed only when the piston 100 is at its top position; 116 is closed only when said piston is at its bottom position and both switches are open when the piston is in intermediate positions. Desirably the operation may be started with the piston 100 in bottom position and the switch 116 closed as shown. Solenoids 148, 149 are deenergized and the hydraulic arrangement through the branches of the ducts 154, 155 can be made such that in this position the pusher piston rod 39 is retracted downwards; the filler piston 100 as mentioned is at its bottom position; the sealer and stapler piston rods 130, 131 are in sealing position or extended forward and the lifter member 139 is extended and raised.

It is further necessary at the start of the operation to have an uninterrupted row of cartons on the machine extending from the position 26 to the discharge station 27 or at least to the resealer 13 in order to insure proper movement of newly supplied cartons. As a new carton now arrives at the entrance station 25 the feeler or starting switch 68 closes, energizing the solenoid 149 and reversing the four-way valve 150. Thereupon the pusher piston 39 is extended forwardly pushing the newly added carton through the unsealer station 11, where its preformed hermetic seal 57 is broken and opened, and pushing the carton further into contact with the original row at 26 and still further into such position that the new carton has its rear wall at 26 and that the row of cartons is moved one step forward. Such movement is allowed since in the interval between the start of the forward pusher stroke and the carton's arrival at 26, the previously sealing pistons 130, 131 have been retracted by the same reversal of the four-way valve 150. Also the lifter piston 139 has been lowered. The filler piston 100 has been raised in the meantime.

The opening of switch 68, as a newly added carton leaves the entrance station 25, has no effect other than deenergization of the solenoid 149; this effect is also insured more or less simultaneously by the opening of the filler bottom switch 116. A new electric impulse occurs when the tip 50 of the pusher control rod 48 reaches the feeler 52 of the limit switch 53 closing the same, the filler meanwhile having closed the switch 115. Solenoid 148 is now energized and the four-way valve 150 is returned to its original position. As a result the pusher starts its return stroke; the filler piston 100 starts its downward or filling stroke, at a speed controlled at 156; the sealer and stapler pistons 130, 131 move rapidly in and the lifter 139 moves rapidly up. Thus the row of cartons is now stationary in its horizontal travel; the carton below the filler opening 77 is being filled and the carton between the sealer and stapler pistons is being resealed. It is believed to be unnecessary in this rapid description of the basic operating cycle to refer once more to the preparatory actions for filling and sealing, effected by the spreader plate 70 and coordinated mechanism, which has been explained in detail above.

The next impulse occurs when the filling has been completed and the filler bottom switch 116 closes, assuming that in the meantime a new carton has been delivered to the entrance station 25 and the feeler or starting switch 68 closed. The operation then repeats itself in the manner as described above. A continuous cycle of operations is thus effected, which can be summarized briefly as follows:

|  | Position I | Position II | Position III |
| --- | --- | --- | --- |
| Carton Switch 68 | Closed | Open | Closing. |
| Retract Switch 53 | Open | Closed | Open. |
| Filler Top Switch 115 | Open | Closed | Open. |
| Filler Bottom Switch 116 | Closed | Open | Closed. |
| Four-Way Valve 150 | Pos. A | Pos. B | Pos. B. |
| Pusher Piston 39 | Pushing | Retracting | Retracted. |
| Filler Piston | Rising | Filling | Down. |
| Sealer Pistons 130-1 | Retracting | Sealing | In. |
| Lifter Piston 139 | Down | Rising | Up. |

It will be seen that only three basic positions are required: A primary position for pushing, that is for basic horizontal actuation of the row of cartons and unsealing of the newly added carton; a secondary position for filling a carton and sealing another; and a third position for completion of the retracting stroke of the pusher and reversal of the carton switch 68. All other actions, including suitable speed control of the filler to suit the material being filled, follow in a simple automatic sequence.

The machine is capable of rapid operation. It fills twenty quart containers per minute or ten half-gallon containers per minute without difficulty. More rapid filling is generally undesirable when materials such as milk or cream are involved.

It will be seen that only a few seconds are required for all operations on each carton. The vastly greater part of this time is devoted to the filling operation, position II. Only a short time interval is used for the entire sequence of auxiliary operations, including the pushing of individual cartons through the unsealing station 11 and the preparation of cartons for filling between positions 26 and 12 and for resealing between positions 12 and 13.

The most delicate part of these auxiliary operations, in view of the considerable difference between fine details of carton construction, is the unsealing of the cartons at station 11. A preformed adhesive seal 57 of several inches length must be broken within a fraction of a second and without appreciable vibration of the following row of cartons or of course of the entire machine. In some cases this unsealing operation may require a mechanism slightly different from that which has been shown.

For instance, referring to FIGURES 21 and 22 it may be desirable to replace the hook 54 of round bar material by a combined wedge and cutter member 157, rocking on the shaft 58 in the same manner as has been described. By means of a counterweight 158 this wedge and cutter member may normally be held so that a shank portion 159 thereof extends from the shaft 58 rearwardly-downwardly at an acute angle with the horizontal as shown, in order to insure rapid and substantial lifting upon the actuation of the dog 51. The member 157 itself is shown as secured to the lower end of the shank 159 and extending slightly upwards and rearwards therefrom. It incorporates a pair of wedge surfaces 160, 161 adapted to apply an upward-outward wedging action upon the underside of the recess 55 in the front wall 32 of a container arriving at the unsealing station, whereby it is adapted to break the front part of the seal 57 during an initial portion of the passage of the container past the breaker. During the remainder of such passage the breaker is in raised position as shown in broken lines. Its member 157 incorporates a knife-edge 162 adapted to apply a splitting action to the inner flap 97 and the parallel and adjacent sloping container wall 56, in the rear part of the seal 57, as the container completes its passage past the breaker. In the absence of such splitting action an unsealer breaker member may sometimes tend to wedge the flap 97 and adjacent wall 56 together rather than to separate them at the end of the unsealing stroke, thereby stalling the machine. Such stalling is safely avoided with combined wedging and cutting members 157, which of course can be shaped very simply in accordance with any new container design, and interchanged equally simply with other breakers on the machine.

It will also be noted by persons skilled in the art that a variety of other modifications can be applied to the machine and method which have been described, all within the scope of the invention which is claimed as follows:

1. In an apparatus of the type used for the unsealing, filling and resealing of food containers, the improvement of filling means for selectively filling said food containers comprising a filler cylinder having a liquid food inlet duct and a liquid food discharge duct, a piston positioned for reciprocal movement within said filler cylinder, means for lifting said piston upwardly within said filler cylinder for enabling liquid food to be drawn into the filler cylinder through said inlet duct, means for moving said piston downwardly within said filler cylinder for causing the liquid food within the cylinder to be discharged through the discharge duct into an unsealed container, an actuator lever, pivot means mounting said actuator lever to a support frame spaced from said filler cylinder, means pivotally connecting one end of said actuator lever to said piston for reciprocal movement therewith, upper limit switch means operatively associated with said actuator lever for actuation thereby when the piston is raised to its uppermost limiting position after filling the filler cylinder with the liquid food, and lower limit switch means operatively associated with said actuator lever for actuation thereby when the piston is lowered a sufficient amount to cause the container to be filled with liquid food from said liquid cylinder for terminating the filling action of the filling means.

2. In an apparatus of the type used for the unsealing, filling and resealing of food containers, the improvement of filling means for selectively filling said food containers comprising a filler cylinder having a liquid food inlet duct and a liquid food discharge duct, piston means positioned for reciprocal movement within said filler cylinder, means for lifting said piston means upwardly within said filler cylinder for enabling liquid food to be drawn into the filler cylinder through said inlet duct, means for moving said piston means downwardly within said filler cylinder for causing the liquid food within the cylinder to be discharged through the discharge duct into an unsealed container, an actuator lever, pivot means mounting said actuator lever to a support frame spaced from said filler cylinder, collar means connecting one end of said actuator lever to said piston means for reciprocal movement therewith, lower limit switch means operatively associated with said actuator lever for actuation thereby when the piston means is lowered a sufficient amount to cause the container to be filled with liquid food from said liquid cylinder for terminating the filling action of the filling means, and means for selectively adjusting the position of said collar means relative to said lower limit switch means to enable said filling means to fill containers of different sizes, as desired.

3. In an apparatus of the type used for the unsealing, filling and resealing of food containers, the improvement of filling means for selectively filling said food containers comprising a filler cylinder defining an enclosure for liquid food, an inlet duct connected to said filler cylinder for transmitting liquid food to the interior of said filler cylinder, an inlet check valve operatively associated with said inlet duct, a discharge duct connected at one end thereof to said filler cylinder and at the other end thereof adapted to be positioned over the unsealed food containers for filling said containers with the liquid food said filler cylinder, an outlet check valve operatively associated with said discharge duct, a piston positioned for reciprocal movement within said filler cylinder, means for lifting said piston upwardly within said filler cylinder to open the inlet check valve for enabling liquid food to be drawn into the filler cylinder and for closing said outlet check valve, means for moving said piston downwardly within said filler cylinder to close said inlet check valve and to open said outlet check valve for causing the liquid food within the cylinder to be discharged through the discharge duct into the unsealed container, an elongated actuator lever, means pivotally mounting said actuator lever for reciprocal movement with said piston, upper limit switch means operatively associated with said actuator lever for actuation thereby when the piston is raised to its uppermost limiting position after filling the filler cylinder with the liquid food, and lower limit switch means operatively associated with said actuator lever for actuation thereby when the piston is lowered a sufficient amount to cause the container to be filled with liquid food from said liquid cylinder for terminating the filling action of the filling means.

4. In an apparatus of the type used for the unsealing, filling and resealing of food containers, the improvement of filling means for selectively filling said food containers comprising a filler cylinder defining an enclosure for liquid food, an inlet duct connected to said filler cylinder for transmitting liquid food to the interior of said filler cylinder, an inlet check valve operatively associated with said inlet duct, a discharge duct connected at one end thereof to said filler cylinder and at the other end thereof adapted to be positioned over the unsealed food containers for filling said containers with the liquid food from said filler cylinder, an outlet check valve operatively associated with said discharge duct, a piston positioned for reciprocal movement within said filler cylinder, means for lifting said piston upwardly within said filler cylinder to open the inlet check valve for enabling liquid food to be drawn into the filler cylinder and for closing said outlet check valve, means for moving said piston downwardly within said filler cylinder to close said inlet check valve and to open said outlet check valve for causing the liquid food within the cylinder to be discharged through the discharge duct into the unsealed container, a pivotally mounted elongated actuator lever, pin and slot means connecting one end of said actuator lever to said piston for reciprocal movement with said piston, upper limit switch means operatively associated with said actuator lever for actuation thereby when the piston is raised to its uppermost limiting position after filling the filler cylinder with the liquid food, lower limit switch means operatively associated with said actuator lever for actuation thereby when the piston is lowered a sufficient amount to cause the container to be filled with liquid food from said liquid cylinder for terminating the filling action of the filling means, and selectively positionable means for moving said pin and slot means relative to said piston to permit containers of different sizes to be filled automatically under control of said upper and lower limit switch means.

5. The improvement of filling means in accordance with claim 4 further comprising an elongated piston shaft connected to said piston, said selectively positionable means comprising a removable split collar detachably fastened to said piston shaft whereby the vertical adjustment of the split collar on said piston shaft adjusts the filling means for the filling of containers of different sizes.

6. In an apparatus of the type used for the unsealing, filling and resealing of food containers, the improvement of filling means for selectively filling said food containers comprising a filler cylinder having a hollow interior defined by a side wall and a bottom wall, a first opening formed in said bottom wall, said first opening having an inlet duct connected thereto for transmitting liquid food from a source to the interior of said filler cylinder, an inlet check valve operatively associated with said inlet duct for permitting the liquid food to pass through the inlet duct into the interior of said filler cylinder and for preventing the liquid food within the filler cylinder from being discharged therefrom through the inlet duct, a second opening formed in the bottom wall of said filler cylinder, a discharge duct connected at one end thereof to said second opening and at the other end thereof adapted to be positioned over the unsealed food containers for filling said containers with the liquid food from said filler cylinder, an outlet check valve operatively associated with said discharge duct for permitting the liquid food within the filler cylinder to be discharged into an unsealed container and for preventing any liquid food within the unsealed container from being drawn upwardly through the discharge duct into the filler cylinder, a piston positioned for reciprocal movement within said filler cylinder, means for lifting said piston upwardly within said filler cylinder to open the inlet check valve for enabling liquid food to be drawn into the filler cylinder and for closing said outlet check valve, means for moving said piston downwardly within said filler cylinder to close said inlet check valve and to open said outlet check valve for causing the liquid food within the cylinder to be discharged through the discharge duct into the unsealed container, an actuator lever, pivot means pivotally mounting said actuator lever to a support frame spaced from said filler cylinder, means pivotally connecting one end of said actuator lever to said piston for reciprocal movement therewith, upper limit switch means operatively associated with said actuator lever for actuation thereby when the piston is raised to its uppermost limiting position after filling the filler cylinder with the liquid food, and lower limit switch means operatively associated with said actuator lever for actuation thereby when the piston is lowered a sufficient amount to cause the container to be filled with liquid food from the said liquid cylinder for terminating the filling action of the filling means.

References Cited in the file of this patent

UNITED STATES PATENTS

| | | |
|---|---|---|
| 1,850,425 | Taylor | Mar. 22, 1932 |
| 1,984,296 | Witter | Dec. 11, 1934 |
| 2,525,295 | Harrington | Oct. 10, 1950 |
| 2,768,581 | Langemack | Oct. 30, 1956 |
| 2,769,464 | Cox | Nov. 6, 1956 |